US005827803A

United States Patent [19]
Loree

[11] Patent Number: 5,827,803
[45] Date of Patent: Oct. 27, 1998

[54] WELL TREATMENT FLUID

[76] Inventor: Dwight N. Loree, 758 Woodpark Rd. S.W., Calgary, Alberta, Canada

[21] Appl. No.: 852,384

[22] Filed: May 7, 1997

[51] Int. Cl.$^6$ ..................................................... C09K 7/06
[52] U.S. Cl. ............................. 507/137; 507/263; 585/1
[58] Field of Search ................................... 507/137, 263; 585/1, 24, 26

[56] References Cited

U.S. PATENT DOCUMENTS

| | | | |
|---|---|---|---|
| 2,612,471 | 9/1952 | Fischer | 507/263 |
| 4,090,562 | 5/1978 | Maly et al. | 507/263 |
| 4,250,044 | 2/1981 | Hinkel | 252/8.55 |
| 4,313,834 | 2/1982 | Harris | 252/8.55 |
| 4,322,307 | 3/1982 | Kettner | 507/263 |
| 4,324,668 | 4/1982 | Harris | 252/8.55 |
| 4,324,669 | 4/1982 | Norman et al. | 252/8.55 |
| 4,369,124 | 1/1983 | Elphingstone | 252/316 |
| 4,472,291 | 9/1984 | Rosano | 252/186.28 |
| 4,560,486 | 12/1985 | Hinkel | 252/8.55 |
| 4,900,456 | 2/1990 | Ogilvy | 507/263 |
| 4,925,497 | 5/1990 | Thierheimer, Jr. | 507/137 |
| 5,106,518 | 4/1992 | Cooney et al. | 252/8.551 |
| 5,124,312 | 6/1992 | Wang | 507/109 |
| 5,143,157 | 9/1992 | Harms | 166/300 |
| 5,169,559 | 12/1992 | Naae et al. | 252/315.3 |
| 5,273,682 | 12/1993 | Danzik | 252/320 |
| 5,305,832 | 4/1994 | Guptz et al. | 166/300 |
| 5,382,728 | 1/1995 | Del Bianco et al. | 585/24 |
| 5,438,039 | 8/1995 | Del Bianco et al. | 507/263 |
| 5,635,457 | 6/1997 | Van Slyke | 507/137 |

OTHER PUBLICATIONS

BP Oil, Product Information ENERFLEX 121, 2 pages, dated Dec. 1996.
Koch Refining Co., Material Safety Data Sheet, 8 pages, dated Apr. 29, 1996. Product is believed to have been available in the marketplace since before one year before the filing of the application.
List of treatments carried out in Canada before 19–Aug.–1996 using a formulation according to aspects of the invention, 1 page.
GC/MS analysis of fluids that existed in the marketplace in the United States prior to a year before the filing date of the application; namely Core Laboratories Analysis of Xysol Waxsol & Fracsol, 13 pages, Oct., 1994.
GC/MS analysis of the shell caroline superjuice; namely Core Laboratories, 5 pages, dated Mar., 1995.
Core Lab Calgary, test results "Heavy Aromatic Distillate", 2 pages, dated Nov. 16, 1994.
C30+ Analysis, WAXSOL, 2 pages dated Sep. 8, 1996.
C30+ Analysis, FRACSOL 30, 3 pages dated Sep. 22, 1996.
C30+ Analysis, XYSOL, 2 pages dated Sep. 16, 1996.
C30+ Analysis, SOLUENE 24, 2 pages dated Sep. 6, 1996. Soluene was also in the marketplace prior to one year before the filing of the application.
Core Laboratories Canada Ltd. Laboratory Test Results, SOLUENE +24, 2 pages.
Core Laboratories Reservoir Fluids Report for Trysol Canada Ltd. 3 pages, 01 31 1996.
C30+ Analysis, FX–2 Plant Sample, 1 page, dated Aug. 29, 1996. Product is believed to have been available in the marketplace since before one year before the filing of the application.
Core Laboratories Canada Ltd. Laboratory Test REsults, Light Cycle Oil (new cut), 1 page, dated Jan. 22, 1996. Product is believed to have been available in the marketplace since before one year before the filing of the application.
Core Laboratories Reservoir Fluids Report, 2 pages dated 1996 01 23.
Core Laboratories Reservoir Fluids Report, 3 pages dated 1996 02 27.
C30+ Analysis, SOLUENE (HAD), 1 page, dated Oct. 9, 1996.
C30+ Analysis, ADVASOL 150, 1 page, dated Oct. 29, 1996. Produc is believed to have been available in the marketplace since before one year before the filing of the application.
Asphaltene–Compatible Fluid Design for Workover Operations, A.K.M. Jamaluddin, T.W. Nazarko, B.J. Fuhr, presented at the 6th Unitar International Conference on Heavy Crude and Tar Sands, in Houston, Texas, U.S.A., Feb. 12–17, 1995, 27 pages.
Deasphalted Oil: A Natural Alphaltene Solvent, A.K.M. Jamaluddin, T.W. Nazarko, S. Sills, B.J. Fuhr, SPE 28994, 12 pages, presented at the SPE International Symposium on Oilfield Chemistry in San Antonio, Texas, U.S.A., Feb. 14–17, 1995.
Asphaltene Stabilization in Aklkyl Solvents Using Oil–Soluble Amphiphiles, Chia–Lu Chang and H.S. Fogler, SPE 25185, pp. 339–349, paper presented Mar. 2–5, 1993, SPE International Symposium on Oilfield Chemistry, New Orleans, LA, U.S.A..
Gulf Canada Limited, Gulf Arosol HTU, pp. 1–3 and General Characteristics Table, (1985).
N.E. Burke et al., Measurement and Modeling of Asphaltene Precipitation From Live Reservoir Fluid Systems, Society of Petroleum Engineers, SPE 18273, pp. 113–126, (1988).

(List continued on next page.)

Primary Examiner—Philip Tucker
Attorney, Agent, or Firm—Christensen O'Connor Johnson & Kindness PLLC

[57] ABSTRACT

A well treatment fluid comprising a mixture of (A) a major amount of a first hydrocarbon fluid, the first hydrocarbon fluid being composed predominantly of diaromatics and triaromatics having more than 16 carbon atoms, and (B) a minor amount of a second hydrocarbon fluid, the second hydrocarbon fluid being composed predominantly of hydrocarbons having from 7 to 12 carbon atoms. The mixture preferably has a density greater than 1000 kg/m$^3$ at 15° C. and a viscosity lower than 30 centiStokes at 20° C. In a method according to the invention, a kill fluid is formed by mixing the first and second hydrocarbon fluids to produce a hydrocarbon mixture, preferably having a viscosity of less than 30 centiStokes at 20° C. and a density above 1000 kg/m$^3$ at 15° C.

21 Claims, No Drawings

OTHER PUBLICATIONS

B.R. Hassen et al., Improving Oilwell Stimulations with Compatible Oils, Journal of Canadian Petroleum Technology, pp. 30, 32–38, (1986).

Mixture For Removing Asphalt, Tar and Paraffin Deposits, Derwent Publications LTD., London, GB, AN 89–083539 & SU, A, 1 421 751, Sep. 1988.

Trysol product brochure, KILLSOL, 2 pages, invoice from printer is dated Apr. 18, 1996. It is not known when the brochure was first distributed to customers, although it would be after that date. Distribution of the brochure to customers was initially in Canada. It is believed that sales attempts were not made in the United States prior to May 7, 1996.

WELL TREATMENT FLUID

FIELD OF THE INVENTION

This invention relates to hydrocarbon fluids used to treat oil and gas wells, and to a method of making such a fluid.

BACKGROUND OF THE INVENTION

The ideal kill fluid has density above 1000 kg/m$^3$ at 15° C., low viscosity, high flash point, is non-aqueous, has a pour point that is suitable for winter use, and is compatible with a wide variety of geologic formations.

Such fluids are difficult to obtain. Aqueous saline fluids have high flash point and low viscosity, but tend to be damaging to formations. Condensates and light petroleum distillates typically have densities much lower than 1000 kg/m$_3$. Heavier hydrocarbon fluids are often not suitable due to low viscosity and may be formation damaging, particularly if they contain wax and asphaltene components. On the other hand, hydrocarbon fluids that are high in aromatics are preferred for use in wells since they tend to be compatible with a wide range of reservoirs.

SUMMARY OF THE INVENTION

There is therefore provided in accordance with a first aspect of the invention, a well treatment fluid comprising a mixture of (A) a major amount of a first hydrocarbon fluid, the first hydrocarbon fluid being composed predominantly of polycyclic aromatics having more than 16 carbon atoms, and (B) a minor amount of a second hydrocarbon fluid, the second hydrocarbon fluid being composed predominantly of hydrocarbons having from 7 to 12 carbon atoms, wherein the mixture has a density greater than 1000 kg/m$^3$ at 15° C. and a viscosity lower than 30 centistokes at 20° C.

In a further aspect of the invention, there is provided a method of producing a well treatment fluid, comprising the steps of:

obtaining a first hydrocarbon fluid, the first hydrocarbon fluid being composed predominantly of polycyclic aromatics and having a density greater than 1000 kg/m$^3$ at 15° C. and a viscosity at 20° C. greater than 30 centistokes;

obtaining a second hydrocarbon fluid, the second hydrocarbon fluid being composed predominantly of hydrocarbons having from 7 to 12 carbon atoms and having a density less than 1000 kg/m$^3$ at 15° C.; and mixing the second hydrocarbon fluid with the first hydrocarbon to produce a hydrocarbon mixture. Preferably, the hydrocarbon mixture has a viscosity of less than 30 centistokes at 20° C. and a density above 1000 kg/m$^3$ at 15° C.

The second hydrocarbon fluid is a diluent, and preferably has more than 50 LV % aromatics, and comprises 15 LV % or more of the mixture. The resultant mixture preferably has a viscosity lower than 15 centiStokes at 20° C.

The first hydrocarbon fluid is preferably a light cycle oil that comprises at least 80 LV % of aromatics.

The fluid according to the invention may be used to treat a well by injecting it into a well according to known methods.

In a further aspect of the invention, a method of treating a well with a hydrocarbon fluid mixture in association with a target fluid that has a known density involves selecting the proportions of a first fraction composed predominantly of polycyclic aromatics having more than 16 carbon atoms and a second fraction composed predominantly of hydrocarbons having from 7 to 12 carbon atoms such that the mixture has a density matching the known density of the target fluid. This hydrocarbon fluid mixture is then injected into the well.

In a further aspect of the invention, there is provided a method of treating a well, the method comprising the step of:

injecting into the well a hydrocarbon fluid mixture composed predominantly of polycyclic aromatics having more than 16 carbon atoms.

These and other aspects of the invention are described in the detailed description of the invention and claimed in the claims that follow.

DETAILED DESCRIPTION OF PREFERRED EMBODIMENTS

The preferred kill fluid according to the invention is a 100% hydrocarbon kill fluid with density greater than 1000 kg/m$^3$ and viscosity less than 30 cSt at 20°. In this patent document, "predominantly" in relation to a fluid component means 50% or more by volume of that component in the fluid. Also, in this patent document, the term "aromatic" includes hydrocarbons such as naphthalenes that have functional equivalence, in terms of their solvating capabilities, to hydrocarbons that are formed with benzene rings.

This preferred kill fluid is formed by first obtaining a light cycle oil having a density greater than 1000 kg/m$^3$ and a viscosity greater than 30 cSt (cSt designates centiStokes). The preferred fluid is predominantly composed of polycyclic aromatics having more than 16 carbon atoms, preferably having 20 or more carbon atoms, preferably has more than about 80 LV % aromatics, and more particularly preferably comprises (all figures show LV % as determined by mass spectrometry per ASTM D-2549, 2786 and 3239) the following components:

Summary:

| | |
|---|---|
| Paraffins | 4.0 |
| Naphthenes | 6.3 |
| Aromatics | 89.7 |

The Naphthenic Distribution of the preferred fluid is:

| | |
|---|---|
| 1 Ring | 1.6 |
| 2 Ring | 1.8 |
| 3 Ring | 2.1 |
| 4 Ring | 0.8 |

The Aromatic Distribution of the preferred fluid is:

| | |
|---|---|
| Monoaromatics | 10.9 |
| — Naphthenebenzenes | 5.8 |
| --- Dinaphthenebenzenes | 5.1 |
| Diaromatics | 42.4 |
| --- Naphthalenes | 19.9 |
| --- Acenaphthenes/Dibenzofurans | 11.1 |
| --- Fluorenes | 11.4 |
| Triaromatics | 27.5 |
| --- Phenenanthrenes | 22.9 |
| --- Naphthenephenanthrenes | 4.6 |
| Tetraaromatics | 4.8 |
| --- Pyrenes | 4.8 |
| Thiopheno Aromatics | 4.1 |
| --- Benzothiophenes | 2.1 |
| --- Dibenzothiophenes | 2.0 |

The polycyclic aromatics are preferably predominantly diaromatics and triaromatics, however, providing a formulation of the light cycle oil remains formation compatible and not too viscous for practical use, the polycyclic aromatics may include various amounts of tetraaromatics.

This fluid contains the following constituents according to gas chromatography:

| | |
|---|---|
| Heptanes | 0.13 |
| Octanes | 0.28 |
| Nonanes | 0.37 |
| Decanes | 2.27 |
| Tetradecanes | 1.49 |
| Pentadecanes | 3.78 |
| Hexadecanes | 5.02 |
| Heptadecanes | 5.44 |
| Octadecanes | 6.99 |
| Nonadecanes | 9.62 |
| Eicosanes | 17.63 |
| Heneicosanes | 13.55 |
| Docasanes | 20.72 |
| Tricosanes | 10.47 |
| Tetracosanes | 2.24 |

From this it can be seen that the fluid is predominantly composed of diaromatics, triaromatics and other hydrocarbons having more than 16 carbon atoms, and is more than 50 LV % hydrocarbons having 20 or more carbon atoms. Diaromatics and triaromatics are important components of the well treatment fluid of the invention since they are heavy components and yet when added to a well, particularly with a diluent high in aromatics, tend not to be formation damaging.

Such a fluid is available from Koch Refining Company, L.P. of St. Paul, Minn. This light cycle oil has an initial density of approximately 1045 kg/m$^3$, a pour point of $-21°$ C., a flashpoint of 146° C. (PMCC) and a viscosity at 20° C. of 40.62 cSt.

The light cycle oil may be injected into a well directly in conditions that maintain the fluid with a suitable viscosity, preferably lower than 50 cSt at the ambient conditions, that allows it to flow and be injected into the well. If the fluid is not warm enough to flow, it may be heated and kept warm for injection into a well.

The light cycle oil is, however, for most applications, mixed with a diluent hydrocarbon fluid, preferably a condensate or light petroleum distillate, that has a sufficiently low viscosity that the mixture has a density greater than 1000 kg/m$^3$ at 15° C. and a viscosity lower than 30 centistokes at 20° C., while the mixture remains formation compatible. The light cycle oil is preferably the major component (more than 50 LV %) and the diluent is preferably the minor component (less than 50 LV %).

A preferred diluent with which the light cycle oil may be mixed is known by the trademark WAXSOL™, may be obtained from Trysol Canada Ltd. of Calgary, Alberta, Canada and has the following properties:

| | |
|---|---|
| Aromatics | 59 LV % |
| Flashpoint (PMCC) | 12 deg. C. |
| Flashpoint (COC) | 15 deg. C. |
| Absolute Density | 785 kg/m3 @ 15 deg. C. |
| API Gravity | 48 deg. C. |
| Cloud Point | -22 deg. C. |
| Pour Point | <-60 deg. C. |
| Reid Vapour Pressure | 4 kPa @ 37.8 deg. C. |

WAXSOL™ fluid is composed approximately of the following hydrocarbons (LV % according to gas chromatography):

| | |
|---|---|
| iso-Pentane | 0.39 |
| n-Hexanes | 0.31 |
| Heptanes | 11.07 |
| Octanes | 14.90 |
| Nonanes | 8.30 |
| Decanes | 10.66 |
| Undecanes | 6.15 |
| Dodecanes | 3.62 |
| Tridecanes | 2.30 |
| Tetradecanes | 1.21 |
| Pentadecanes | 0.50 |
| Hexadecanes | 0.30 |
| Heptadecanes | 0.17 |
| Octadecanes | 0.13 |
| Nonadecanes | 0.08 |
| Eicosanes | 0.02 |
| Heneicosanes | 0.01 |
| Docosanes | 0.02 |
| Benzene | 0.46 |
| Toluene | 11.40 |
| Ethyl Benzene,m+p-xylene | 14.53 |
| o-Xylene | 2.61 |
| 1,2,4-trimethylbenzene | 2.14 |
| Cyclopentane | 0.02 |
| Methylcyclopentane | 0.46 |
| Cyclohexane | 1.21 |
| Methylcyclohexane | 7.01 |

As used in this patent document, LV means liquid volume. It is preferred that the WAXSOL™ fluid be added in an amount of about 15 LV % of the mixture to yield the mixture having the properties defined above.

The resultant fluid mixture, when the light cycle oil fraction constitutes 85 LV % and the diluent WAXSOL™ fraction constitutes 15 LV %, has a density of approximately 1006 kg/M$^3$, a pour point of $-37°$ C., a flashpoint of 28° C. (PMCC), a viscosity at 20° C. of 12.36 cSt, contains 89 LV % aromatics, has a Reid vapour pressure of 4 kPa @37.8 deg.C, Flashpoint (COC) 37° C., API Gravity 9 deg., Cloud Point $-16°$ C. and a Pour Point of $-37°$ C. Viscosity at $-20°$ C. is 211.6 cSt, at 0° is 35.82 cSt, and at 5° C. is 25.83 cSt. Mixtures according to the invention that have a viscosity less than 16 cSt at 20° C. are believed particulary useful. For a blend of 95 LV % light cycle oil and 5 LV % WAXSOL™ diluent, the fluid at $-20°$ C. is frozen, at 0° C. has a viscosity of 103.9 cSt, at 5° C. has a viscosity of 70.14 cSt and at 20° C. has a viscosity of 25.87 cSt. While the 95/5 blend has a density higher than that of the 85/15 blend, it is not pumpable at $-20°$ C., which limits its utility for winter use.

The resultant mixture has a bimodal carbon distribution in that the mixture has a minor peak in the gas chromatographic analysis between $C_7$ and $C_{10}$, due to the diluent fraction, and another peak centered at about $C_{20}$ to $C_{22}$, due to the diaromatic and triaromatic fraction. The $C_7$ to $C_{10}$ components provide low viscosity, while the $C_{20}$ to $C_{22}$ components provide weight.

Depending on the proposed use, other formation compatible light hydrocarbons (predominantly composed of $C_7$–$C_{12}$ hydrocarbons) may be mixed with the light cycle oil in place of or in addition to the WAXSOL™ fluid.

A further exemplary diluent is FRACSO™ hydrocarbon fluid available from Trysol Canada Ltd. of Calgary, Alberta, Canada, whose properties are as follows:

| | |
|---|---|
| Aromatics | 63 LV % |
| Reid Vapour Pressure | <1 kPa @ 37.8 deg. C. |
| Flashpoint (PMCC) | 30 deg. C. |
| Flashpoint (COC) | 35 deg. C. |
| Absolute Density | 815 kg/m3 @ 15 deg. C. |
| API Gravity | 42 deg. C. |
| Surface Tension (Oil to Air) | 25 dynes/cm @ 22 deg. C. |
| Interfacial Tension (Water to Oil) | 27 dynes/cm @ 22 deg. C. |

| | |
|---|---|
| Cloud Point | 8 deg. C. |
| Pour Point | −13 deg. C. |
| Aniline Point | 56 deg. C. |

The composition of FRACSOL™ fluid is approximately as follows (LV % as determined by gas chromatography):

| | |
|---|---|
| Heptanes | 1.85 |
| Octanes | 8.77 |
| Nonanes | 7.81 |
| Decanes | 9.29 |
| Undecanes | 8.44 |
| Dodecanes | 6.00 |
| Tridecanes | 5.74 |
| Tetradecanes | 5.42 |
| Pentadecanes | 3.80 |
| Hexadecanes | 3.78 |
| Heptadecanes | 3.28 |
| Octadecanes | 3.28 |
| Nonadecanes | 3.74 |
| Eicosanes | 2.40 |
| Heneicosanes | 2.75 |
| Docasanes | 2.19 |
| Tricosanes | 1.62 |
| Tetracosanes | 1.76 |
| Pentacosanes | 1.21 |
| Hexacosanes | 1.11 |
| Heptacosanes | 0.86 |
| Octacosanes | 0.80 |
| Nonacosanes | 0.67 |
| Triacontanes | 3.10 |
| Toluene | 1.32 |
| Ethyl Benzene,m=p-xylene | 3.68 |
| o-xylene | 1.68 |
| 1,2,4-trimethylbenzene | 1.72 |
| Methylcyclopentane | 0.01 |
| Cyclohexane | 0.04 |
| Methylcyclohexane | 1.89 |

Up to 19.56 LV % FRACSOL™ diluent may be added to the light cycle oil with the density of the mixture remaining above 1000 kg/m³ at 15° C.

A further example diluent is XYSOL™ blend hydrocarbon fluid available from Trysol Canada Ltd. of Calgary, Alberta, Canada, whose properties are as follows:

| | | |
|---|---|---|
| Aromatics | 51 | LV % |
| Flashpoint (PMCC) | 24 | deg. C. |
| Flashpoint (COC) | 23 | deg. C. |
| Absolute Density | 800 | kg/m3 @ 15 deg. C. |
| PI Gravity | 45 | deg. C. |
| Cloud Point | −48 | deg. C. |
| Pour Point | <−60 | deg. C. |
| Reid Vapour Pressure | 2 | kPa @ 37.8 deg. C. |

The composition of XYSOL™ blend fluid is approximately as follows (LV % as determined by mass spectrometry per ASTM D-2789):

| | |
|---|---|
| Paraffins | 49.00 |
| Monocycloparaffins | 16.60 |
| Dicycloparaffins | 3.59 |
| Alkylbenzenes | 30.20 |
| Indanes/Tetrains | 0.03 |
| Naphthalenes | 0.58 |
| Alkanes (summary) | 49.00 |
| Aromatics (summary) | 51.00 |

XYSOL™ blend composition as determined by gas chromatography is as follows (LV %):

| | |
|---|---|
| Heptanes | 0.83 |
| Octanes | 13.85 |
| Nonanes | 14.29 |
| Decanes | 11.52 |
| Undecanes | 4.46 |
| Dodecanes | 1.56 |
| Tridecanes | 0.63 |
| Tetradecanes | 0.54 |
| Pentadecanes | 0.20 |
| Hexadecanes | 0.44 |
| Heptadecanes | 0.16 |
| Octadecanes | 0.18 |
| Nonadecanes | 0.11 |
| Eicosanes | 0.11 |
| Heneicosanes | 0.05 |
| Docosanes | 0.05 |
| Tricosanes | 0.02 |
| Benzene | 0.01 |
| Toluene | 4.97 |
| Ethylbenzene,p+m-Xylene | 20.91 |
| o-Xylene | 5.39 |
| 1,2,4 Trimethylbenzene | 2.47 |
| Complex Aromatics | 15.02 |
| Cyclohexane | 0.02 |
| Methylcyclohexane | 2.21 |

A further example of a diluent is SOLUENE™ 24 hydrocarbon fluid available from Trysol Canada Ltd. of Calgary, Alberta, Canada, whose properties are as follows:

| | | |
|---|---|---|
| Aromatics | 50 | LV % |
| Flashpoint (PMCC) | 24 | deg. C. |
| Flashpoint (COC) | 23 | deg. C. |
| Absolute Density | 780 | kg/m3 @ 15 deg. C. |
| API Gravity | 49.8 | deg. |
| Cloud Point | <−60 | deg. C. |
| Pour Point | <−60 | deg. C. |
| Reid Vapour Pressure | 2 | kPa @ 37.8 deg. C. |

The composition of SOLUENE 24™ fluid is approximately as follows (LV % as determined by mass spectrometry per ASTM D-2789):

| | |
|---|---|
| Paraffins | 53.08 |
| Monocycloparaffins | 17.01 |
| Dicycloparaffins | 3.05 |
| Alkylbenzenes | 26.37 |
| Indanes/Tetrains | 0.03 |
| Naphthalenes | 0.46 |
| Alkanes (summary) | 53.08 |
| Aromatics (summary) | 46.92 |
| Heptanes | 0.84 |
| Octanes | 14.05 |
| Nonanes | 19.22 |
| Decanes | 14.64 |
| Undecanes | 3.06 |
| Dodecanes | 0.65 |
| Tridecanes | 0.22 |
| Tetradecanes | 0.08 |
| Pentadecanes | 0.07 |
| Hexadecanes | 0.11 |
| Heptadecanes | 0.04 |
| Octadecanes | 0.04 |
| Nonadecanes | 0.03 |
| Eicosanes | 0.03 |
| Toluene | 2.00 |
| Ethylbenzene,p+m-Xylene | 23.70 |
| o-Xylene | 6.81 |
| 1,2,4 Trimethylbenzene | 2.98 |
| Complex Aromatics | 9.76 |
| Cyclohexane | 0.02 |
| Methylcyclohexane | 1.65 |

A further example of a diluent is FX-2 hydrocarbon fluid available from Amoco Canada of Calgary, Alberta, Canada, whose composition is approximately as follows (LV % as determined by gas chromatography):

| | |
|---|---|
| iso-Pentane | 0.04 |
| n-Pentane | 0.06 |
| n-Hexanes | 1.22 |
| Heptanes | 18.19 |
| Octanes | 20.60 |
| Nonanes | 11.48 |
| Decanes | 8.43 |
| Undecanes | 4.69 |
| Dodecanes | 2.25 |
| Tridecanes | 1.52 |
| Tetradecanes | 0.65 |
| Pentadecanes | 0.38 |
| Hexadecanes | 0.28 |
| Heptadecanes | 0.24 |
| Octadecanes | 0.20 |
| Nonadecanes | 0.09 |
| Eicosanes | 0.07 |
| Heneicosanes | 0.06 |
| Docosanes | 0.06 |
| Tricosanes | 0.13 |
| Tetracosanes | 0.07 |
| Pentacosanes | 0.06 |
| Hexacosanes | 0.06 |
| Heptacosanes | 0.04 |
| Octacosanes | 0.09 |
| Benzene | 0.19 |
| Toluene | 5.04 |
| Ethyl Benzene,m+p-xylene | 4.89 |
| o-Xylene | 1.84 |
| 1,2,4-trimethylbenzene | 0.14 |
| Cyclopentane | 0.02 |
| Methylcyclopentane | 0.46 |
| Cyclohexane | 1.14 |
| Methylcyclohexane | 13.04 |

A mixture of 12% FX-2™ and light cycle oil has density of 1087 kg/m³ at 15° C., viscosity of 12.95 cSt at 20° C., cloud point of −18° C., pour point of −39° C. and a flash point of 27° C.

While each of the hydrocarbon fluids WAXSOL™, XYSOL™, SOLUENE 24™ and FRACSOL 30™ with which the light cycle oil may be mixed has more than 50 LV % aromatics, and this is preferred, it is believed possible to use a condensate or light petroleum distillate having as low as 30 LV % aromatics.

A further example of a diluent is SOLUENE™ HAD hydrocarbon fluid available from Trysol Canada Limited of Calgary, Alberta, Canada, whose composition is approximately as follows (LV % as determined by gas

| | |
|---|---|
| Nonanes | 0.18 |
| Decanes | 11.16 |
| Undecanes | 60.35 |
| Dodecanes | 16.59 |
| Tridecanes | 1.62 |
| Tetradecanes | 0.39 |
| Pentadecanes | 0.33 |
| Hexadecanes | 0.11 |
| Heptadecanes | 0.17 |
| Octadecanes | 0.11 |
| Nonadecanes | 0.03 |
| Eicosanes | 0.01 |
| Heneicosanes | 0.01 |
| Toluene | 0.06 |
| Ethyl Benzene,m+p-xylene | 5.75 |
| o-Xylene | 1.15 |
| 1,2,4-trimethylbenzene | 1.99 |

When a mixture of 10 LV % SOLUENE™ HAD is mixed with 90 LV % light cycle oil (density 1040), the fluid had a pour point of −42° C., a density of 1030 kg/m₃ at 15° C., and a viscosity of 20 cSt at 20° C. The density of SOLUENE™ HAD is 924 kg/m₃ at 15° C.

After mixing the light cycle oil with one or more of the diluents as outlined above, the fluid may be injected into a well to kill the well in accordance with known techniques.

A further example of a fluid believed to have utility for providing high density components is a light cycle oil available from Koch Refining Company that has the following characteristics:

| | | |
|---|---|---|
| Absolute Density @ 15.0 deg C. | 1090 kg/m³ | ASTM D-4052 |
| Pour Point | −15 deg C. | ASTM D-97 |
| Flash Point (PMCC) @ 101.325 kPa | 201 deg C. | ASTM D-93 |
| Color | orange | |

Cloud Pt: Fluid gelled with no apparent crystal formation
Reid Vapour Pressure @37.8 deg C: Fluid is too viscous @0 deg C for measurement

| | | |
|---|---|---|
| Kinematic Viscosity @ −0 deg C. | >150,000 | ASTM D-445 |
| Kinematic Viscosity @ 20 deg C. | 3323 | |
| Kinematic Viscosity @ 40 deg C. | 209.9 | |
| Kinematic Viscosity @ 60 deg C. | 40.10 | |

Fluid composition of this high density fluid as determined by mass spectrometry is as follows (LV %):

| | |
|---|---|
| Paraffins | 0.8 |
| Naphthenes | 9.2 |
| Aromatics | 90.0 |

Naphthenic Distribution-Caps

| | |
|---|---|
| 1 Ring | 1.1 |
| 2 Ring | 1.9 |
| 3 Ring | 2.3 |
| 4 Ring | 1.9 |
| 5 Ring | 1.3 |
| 6 Ring | 0.7 |

Aromatic Distribution

| | |
|---|---|
| Monoaromatics | 5.0 |
| Alkylbenzenes | 0.0 |
| Naphthenebenzenes | 1.8 |
| Dinaphthenebenzenes | 3.2 |
| Diaromatics | 8.8 |
| Naphthalenes | 0.5 |
| Acenaphthenes/Dibenzofurans | 3.4 |
| Fluorenes | 4.9 |
| Triaromatics | 25.0 |
| Phenenanthrenes | 14.1 |
| Naphthenephenanthrenes | 10.9 |
| Tetraaromatics | 40.9 |
| Pyrenes | 33.1 |
| Chyrsenes | 7.8 |
| Pentaaromatics | 0.5 |
| Perylenes | 0.5 |
| Dibenzanthracenes | 0.0 |
| Thiopheno Aromatics | 6.1 |
| Benzothiophenes | 3.1 |
| Dibenzothiophenes | 3.0 |
| Naphthabenzothiophenes | 0.0 |
| Unidentifies Aromatics | 3.7 |
| Class I (See Naph. Phen.) | Inc W/NPA |
| Class II | 0.0 |
| Class III | 0.0 |
| Class IV | 3.6 |
| Class V | 0.0 |

|         |     |
| ------- | --- |
| Class VI  | 0.0 |
| Class VII | 0.1 |

The invention also permits matching the density of the fluid mixture to another fluid. For example, in the case of a squeeze in a heavy oil reservoir, it is desirable to match the squeeze fluid density to the density of the heavy oil. A mixture is selected according to the formula: $(D_{lco} \cdot x + D_{diluent} \cdot (1-x)) = D_{heavy\ oil}$, where $D_{lco}$ is the density of the light cycle oil, eg from Koch Refining Company, $D_{diluent}$ is the density of the diluent, $D_{heavy\ oil}$ is the density of the heavy oil, and x is the fraction of light cycle oil and 1−x is the fraction of the diluent. This mixture then has a density that matches the density of the heavy oil.

In a further example, during acidizing of a well, it is beneficial to add a solvent that has a density equal to the density of the acid, since this is believed to assist in forming a stable emulsion of acid and solvent. A mixture is formed by adding an amount of diluent and the light cycle oil that has a density that matches the density of the acid according to the formula $(D_{lco} \cdot y + D_{diluent} \cdot (1-y)) = D_{acid}$, where $D_{acid}$ is the density of the acid·y is the fraction of light cycle oil. An exemplary acid is HCl, which is typically used in acidizing with a density of 1070 kg/m$_3$ (15% solution). Mixture of the heavy light cycle oil (1090 density) with one of the diluents may be used to achieve this density. The fluid whose density is to be matched may be referred to as the target fluid.

The fluid may be used during squeezing, where pressure is applied to the fluid in a well at lower than frac pressures, during fracs or minifracs where pressure above or just above frac pressure is applied to the fluid in the well, during acidizing, killing the well and other well treatment applications where high or variable density solvents are beneficial.

An alternative to the light cycle oil, but less preferred, is Star petroleum distillate, heavy cycle oil/heavy gas oil available from Star Enterprise of 2000 Wrangle Hill Road, Delaware, Del. 19706. Star petroleum distillate has a density of 1038 kg/m³ at 15° C., a viscosity of 80.6 cSt at 20° C. and pour point of 0° C. The mass spec (204°–538° C.) in LV % for this fluid is as follows:

Summary:

|           |      |
| --------- | ---- |
| Paraffins | 5.4  |
| Naphthenes | 13.1 |
| Aromatics | 81.5 |

The Naphthenic Distribution of this fluid is:

|        |     |
| ------ | --- |
| 1 Ring | 2.3 |
| 2 Ring | 3.5 |
| 3 Ring | 3.2 |
| 4 Ring | 2.6 |
| 5 Ring | 1.1 |
| 6 Ring | 0.4 |

The Aromatic Distribution of this fluid is:

|                     |      |
| ------------------- | ---- |
| Monoaromatics       | 8.6  |
| Alkylbenzenes       | 1.0  |
| Naphthenebenzenes   | 3.3  |
| Dinaphthenebenzenes | 4.3  |
| Diaromatics         | 20.9 |
| Naphthalenes        | 6.7  |
| Acenaphthenes/Dibenzofurans | 6.4 |
| Fluorenes           | 7.8  |
| Triaromatics        | 19.7 |
| Phenenanthrenes     | 15.0 |
| Naphthenephenanthrenes | 4.7 |
| Tetraaromatics      | 12.4 |
| Pyrenes             | 10.4 |
| Chrysenes           | 2.0  |
| Pentaromatics       | 0.2  |
| perylenes           | 0.2  |
| Thiopheno Aromatics | 19.7 |
| Benzothiophenes     | 4.2  |
| Dibenzothiophenes   | 13.9 |
| Napthabenzothiophenes | 1.6 |

A further alternative to the light cycle oil, but less preferred, is #4 fuel oil, a commercial heating oil, available from Koch Refining Company, of St. Paul, Minn., having a density of 1058.4 kg/m³ at 15° C. (measured value, not as shown on the MSDS for this product), a viscosity of 248 cSt at 20° C. and pour point of −21° C. The mass spec (ASTM D-2425) in LV % for this fluid is as follows:

Summary:

|                    |       |
| ------------------ | ----- |
| Paraffins          | 6.43  |
| Monocycloparaffins | 4.64  |
| Dicycloparaffins   | 3.81  |
| Tricycloparaffins  | 2.66  |
| Alkybenzenes       | 2.35  |
| Napthalene         | 0.08  |
| Naphthalenes       | 20.29 |
| Acenaphthenes      | 8.53  |
| Acenaphthalenes    | 9.45  |
| Tricyclic Aromatics | 29.11 |
| Asphaltene         | 8.41  |

A further alternative to the light cycle oil, but less preferred, is LIMA CD 121 available from BP's LIMA refinery. LIMA CD 121 petroleum distillate has a density of 1028.6 kg/m³ at 15° C., too high a viscosity to run a test at 20° C. and pour point of 24° C. Gas chromatography of this fluid shows composition in LV % for this fluid as follows:

|                        |       |
| ---------------------- | ----- |
| Hexadecanes            | 0.03  |
| Heptadecanes           | 0.06  |
| Octadecanes            | 0.14  |
| Nonadecanes            | 0.94  |
| Eicosanes              | 1.55  |
| Heneicosanes           | 1.48  |
| Docosanes              | 6.52  |
| Tricosanes             | 11.85 |
| Tetracosanes           | 17.48 |
| Pentacosanes           | 13.81 |
| Hexacosanes            | 20.53 |
| Heptacosanes           | 13.72 |
| Octacosanes            | 4.36  |
| Nonacosanes            | 3.78  |
| Triacontanes and higher | 3.76 |

The mass spec in LV % for this fluid is as follows:

Summary:

|            |      |
| ---------- | ---- |
| Paraffins  | 7.6  |
| Naphthenes | 22.9 |
| Aromatics  | 69.5 |

The Naphthenic Distribution of this fluid is:

| | |
|---|---|
| 1 Ring | 3.6 |
| 2 Ring | 4.9 |
| 3 Ring | 5.0 |
| 4 Ring | 5.0 |
| 5 Ring | 3.1 |
| 6 Ring | 1.3 |

The Aromatic Distribution of this fluid is:

| | |
|---|---|
| Monoaromatics | 5.0 |
| Alkylbenzenes | 0.0 |
| Naphthenebenzenes | 1.7 |
| Dinaphthenebenzenes | 3.3 |
| Diaromatics | 8.4 |
| Naphthalenes | 0.0 |
| Acenaphthenes/Dibenzofurans | 3.7 |
| Fluorenes | 4.7 |
| Triaromatics | 21.0 |
| Phenenanthrenes | 11.4 |
| Naphthenephenanthrenes | 9.6 |
| Tetraaromatics | 26.2 |
| Pyrenes | 22.4 |
| Chrysenes | 3.8 |
| Pentaromatics | 0.2 |
| perylenes | 0.2 |
| Thiopheno Aromatics | 6.9 |
| Benzothiophenes | 1.9 |
| Dibenzothiophenes | 4.4 |
| Napthabenzothiophenes | 0.6 |
| Unidentified aromatics | 1.8 |

In the case of use of either LIMA CD 121 or the #4 Koch fuel oil, it is preferred that the diluent be SOLUENE™ HAD light petroleum distillate.

A further alternative to the light cycle oil, but less preferred, is LIMA CD 101 available from BP's LIMA refinery. LIMA CD 101 petroleum distillate has a density of 1006.8 kg/m$^3$ at 15° C., viscosity of 85.99 cSt at 20° C. and pour point of −12° C. Gas chromatography of this fluid shows composition in LV % for this fluid as follows:

| | |
|---|---|
| Hexadecanes | 0.04 |
| Heptadecanes | 0.03 |
| Octadecanes | 0.36 |
| Nonadecanes | 4.23 |
| Eicosanes | 3.53 |
| Heneicosanes | 17.21 |
| Docosanes | 16.94 |
| Tricosanes | 23.48 |
| Tetracosanes | 22.23 |
| Pentacosanes | 6.43 |
| Hexacosanes | 3.85 |
| Heptacosanes | 0.96 |
| Octacosanes | 0.38 |
| Nonacosanes | 0.15 |
| Triacontanes and higher | 0.17 |

The mass spec in LV % for this fluid is as follows:
Summary:

| | |
|---|---|
| Paraffins | 14.26 |
| Monocycloparaffins | 3.83 |
| Dicycloparaffins | 6.23 |
| Tricycloparaffins | 4.34 |
| Alkylbenzenes | 2.82 |
| Indanes/Tetrlins | 3.22 |
| Naphthalenes | 13.06 |
| Acenaphthenes | 6.23 |
| Acenaphthalenes | 7.68 |
| Triaromatics | 38.35 |

This fluid is insufficient to meet the preferred fluid composition when mixed with SOLUENE™ HAD solvent, since the density of such a mixture cannot exceed 1000 kg/m$^3$ at 15° C. while keeping the viscosity below 30 cSt at 20° C. However, this fluid does provide a suitable weighting fluid when mixed with diluents such as SOLUENE™ HAD.

A person skilled in the art could make immaterial modifications to the invention described in this patent document without departing from the essence of the invention that is intended to be covered by the scope of the claims that follow.

The embodiments of the invention in which an exclusive property or privilege is claimed are defined as follows:

1. A well treatment fluid, comprising:
    a mixture of (A) a major amount of a first hydrocarbon fluid, the first hydrocarbon fluid being composed predominantly of polycyclic aromatics having more than 16 carbon atoms, and (B) a minor amount of a second hydrocarbon fluid, the second hydrocarbon fluid being composed predominantly of hydrocarbons having from 7 to 12 carbon atoms; and
    wherein the mixture has a density greater than 1000 kg/m$^3$ at 15° C. and a viscosity lower than 30 centiStokes at 20° C.

2. The well treatment fluid of claim 1 in which the second hydrocarbon fluid comprises at least 30 LV % aromatics.

3. The well treatment fluid of claim 1 in which the second hydrocarbon fluid comprises at least 50 LV % aromatics.

4. The well treatment fluid of claim 1 in which the mixture has a viscosity lower than 15 centiStokes at 20° C.

5. The well treatment fluid of claim 1 in which the second hydrocarbon fluid comprises at least 15 LV % of the mixture.

6. The well treatment fluid of claim 1 in which the first hydrocarbon fluid comprises at least 80 LV % of aromatics.

7. The well treatment fluid of claim 1 in which the polycyclic aromatics are comprised predominantly of diaromatics and triaromatics.

8. A method of producing a well treatment fluid, comprising the steps of:
    obtaining a first hydrocarbon fluid, the first hydrocarbon fluid being composed predominantly of polycyclic aromatics and having a density greater than 1000 kg/m$^3$ at 15° C. and a viscosity at 20° C. greater than 30 centiStokes;
    obtaining a second hydrocarbon fluid, the second hydrocarbon fluid being composed predominantly of hydrocarbons having from 7 to 12 carbon atoms and having a density less than 1000 kg/m$^3$ at 15° C.; and
    mixing the second hydrocarbon fluid with the first hydrocarbon to produce a hydrocarbon mixture.

9. The method of claim 8 in which the hydrocarbon mixture has a viscosity of less than 30 centiStokes at 20° C. and a density above 1000 kg/m$^3$ at 15° C.

10. The method of claim 8 in which the second hydrocarbon fluid comprises at least 30 LV % aromatics.

11. The method of claim 8 in which the second hydrocarbon fluid comprises at least 50 LV % aromatics.

12. The method of claim 9 in which the mixture has a viscosity lower than 15 centiStokes at 20° C.

13. The method of claim 8 in which the second hydrocarbon fluid comprises at least 15 LV % of the mixture.

14. The method of claim 8 in which the first hydrocarbon fluid comprises at least 80 LV % aromatics.

15. The method of claim 8 in which the polycyclic aromatics are comprised predominantly of diaromatics and triaromatics.

16. A method of treating a well, the method comprising the step of:

injecting into the well a hydrocarbon fluid comprising mixture comprising a first fraction composed predominantly of polycyclic aromatics having more than 16 carbon atoms and a second fraction composed predominantly of hydrocarbons having from 7 to 12 carbon atoms, wherein the mixture has a density greater than 1000 kg/m$^3$ at 15° C. and a viscosity lower than 30 centistokes at 20° C.

17. A method of treating a well with a hydrocarbon fluid mixture in association with a target fluid that has a known density, the method comprising the step of:

forming the hydrocarbon fluid mixture by mixing together a first fraction composed predominantly of polycyclic aromatics having more than 16 carbon atoms and a second fraction composed predominantly of hydrocarbons having from 7 to 12 carbon atoms, wherein the mixture has a density matching the known density of the target fluid;

and injecting the hydrocarbon fluid mixture into the well.

18. The method of claim 17 in which the target fluid is acid.

19. The method of claim 17 in which the target fluid is the reservoir fluid.

20. The method of claim 19 in which the hydrocarbon fluid mixture is squeezed in the well.

21. The method of claim 18 in which the hydrocarbon fluid mixture is squeezed in the well.

* * * * *

UNITED STATES PATENT AND TRADEMARK OFFICE
CERTIFICATE OF CORRECTION

PATENT NO. : 5,827,803
DATED : October 27, 1998
INVENTOR(S) : D.N. Loree

It is certified that error appears in the above-indentified patent and that said Letters Patent is hereby corrected as shown below:

COLUMN          LINE

12                  54              after "carbon" insert --fluid--
(Claim 8,   line 20)

13                  6               after "fluid" delete "comprising"
(Claim 16,  line 3)

13                  13              "centistokes" should read --centiStokes--
(Claim 16,  line 10)

13                  16              "step" should read --steps--
(Claim 17,  line 3)

Signed and Sealed this

Twenty-second Day of June, 1999

Attest:

Q. TODD DICKINSON

Attesting Officer         Acting Commissioner of Patents and Trademarks